United States Patent
Ibasco et al.

(10) Patent No.: US 11,423,385 B2
(45) Date of Patent: Aug. 23, 2022

(54) METHOD OF PERFORMING A FINANCIAL TRANSACTION VIA UNSECURED PUBLIC TELECOMMUNICATION INFRASTRUCTURE AND AN APPARATUS FOR SAME

(71) Applicant: EINNOVATIONS HOLDINGS PTE. LTD., Singapore (SG)

(72) Inventors: Alex D. Ibasco, Paranaque (PH); Patrick B. Posadas, Taguig (PH); Vincent C. Co, Makati (PH); William Emmanuel S. Yu, Pasay (PH)

(73) Assignee: EINNOVATIONS HOLDINGS PTE. LTD., Singapore (SG)

( * ) Notice: Subject to any disclaimer, the term of this patent is extended or adjusted under 35 U.S.C. 154(b) by 1643 days.

(21) Appl. No.: 15/194,276

(22) Filed: Jun. 27, 2016

(65) Prior Publication Data
US 2016/0328708 A1 Nov. 10, 2016

Related U.S. Application Data

(62) Division of application No. 13/884,935, filed as application No. PCT/SG2010/000427 on Nov. 10, 2010, now abandoned.

(51) Int. Cl.
*G06Q 20/30* (2012.01)
*H04L 9/32* (2006.01)
(Continued)

(52) U.S. Cl.
CPC ....... *G06Q 20/305* (2013.01); *G06Q 20/3823* (2013.01); *G06Q 20/38215* (2013.01);
(Continued)

(58) Field of Classification Search
None
See application file for complete search history.

(56) References Cited

U.S. PATENT DOCUMENTS

| | | | |
|---|---|---|---|
| 5,812,668 A | | 9/1998 | Weber |
| 5,850,446 A | * | 12/1998 | Berger ............... G06Q 20/12 705/79 |

(Continued)

FOREIGN PATENT DOCUMENTS

| | | |
|---|---|---|
| CN | 1968084 A | 5/2007 |
| CN | 101252729 A | 8/2008 |

(Continued)

OTHER PUBLICATIONS

Ashraf et al (A Conceptual Framework for a SIM-based Electronic Transaction Authentication System) (Year: 2007).*

(Continued)

*Primary Examiner* — Mamon Obeid
(74) *Attorney, Agent, or Firm* — Nixon Peabody LLP

(57) ABSTRACT

An apparatus comprises at least one integrated circuit. The apparatus has a size and shape substantially similar to an ordinary Subscriber Identification Module (SIM) card. The at least one integrated circuit comprises a memory storing first software that, when executed, causes the card to communicate with second software stored on the device. The second software, when executed, causes the device to provide both a SIM and Payment Security Application Module (PSAM) functionality to a user of the device.

2 Claims, 6 Drawing Sheets

(51) Int. Cl.
  *G06Q 20/42* (2012.01)
  *G06Q 20/38* (2012.01)
  *H04W 12/02* (2009.01)
  *H04W 12/033* (2021.01)
  *H04L 9/40* (2022.01)

(52) U.S. Cl.
  CPC ......... *G06Q 20/425* (2013.01); *H04L 9/3234* (2013.01); *H04L 63/0428* (2013.01); *H04W 12/02* (2013.01); *H04W 12/033* (2021.01); *G06Q 2220/00* (2013.01); *H04L 2209/56* (2013.01); *H04L 2209/805* (2013.01)

(56) References Cited

U.S. PATENT DOCUMENTS

| | | | |
|---|---|---|---|
| 5,889,863 A | 3/1999 | Weber | |
| 5,943,424 A * | 8/1999 | Berger | G06Q 20/108 705/64 |
| 5,983,208 A * | 11/1999 | Haller | G06Q 20/202 705/40 |
| 6,002,767 A * | 12/1999 | Kramer | G06Q 20/10 705/79 |
| 6,728,379 B1 * | 4/2004 | Ishibashi | H04L 63/0428 348/E7.056 |
| 6,891,953 B1 * | 5/2005 | DeMello | G06F 21/10 380/259 |
| 7,039,809 B1 * | 5/2006 | Wankmueller | G06Q 20/401 705/72 |
| 7,254,608 B2 | 8/2007 | Yeager | |
| 7,337,332 B2 | 2/2008 | Tsuria et al. | |
| 7,680,974 B2 * | 3/2010 | Brewer | G06K 7/0047 439/352 |
| 8,019,365 B2 * | 9/2011 | Fisher | G06Q 20/40 455/466 |
| 8,201,231 B2 * | 6/2012 | Williams | G06F 21/31 726/7 |
| 8,625,788 B2 | 1/2014 | Pendakur et al. | |
| 8,725,110 B2 * | 5/2014 | Xiong | H04M 15/8207 455/407 |
| 8,949,146 B2 * | 2/2015 | Fisher | G06Q 20/325 705/26.1 |
| 10,037,521 B1 * | 7/2018 | Botros | G06Q 20/16 |
| 10,237,723 B2 * | 3/2019 | Borse | H04W 12/06 |
| 10,311,411 B2 * | 6/2019 | Ibasco | G06Q 20/16 |
| 10,707,972 B1 * | 7/2020 | Zeng | H04B 1/1027 |
| 10,764,044 B1 * | 9/2020 | Giobbi | G06F 21/34 |
| 2002/0103767 A1 * | 8/2002 | Bournat | G06Q 30/04 705/75 |
| 2002/0116344 A1 * | 8/2002 | Kinoshita | G06Q 20/363 705/65 |
| 2003/0004601 A1 * | 1/2003 | Baek | G06F 8/71 700/121 |
| 2003/0145205 A1 * | 7/2003 | Sarcanin | G06Q 20/027 713/172 |
| 2004/0088348 A1 | 5/2004 | Yeager et al. | |
| 2005/0078226 A1 * | 4/2005 | Matoba | G08C 19/28 348/E5.103 |
| 2005/0109837 A1 * | 5/2005 | Van Overbeke | H01Q 5/371 235/380 |
| 2005/0222949 A1 | 10/2005 | Inotay et al. | |
| 2006/0029261 A1 * | 2/2006 | Hoffman | G07C 9/37 382/115 |
| 2006/0137022 A1 * | 6/2006 | Kilian-Kehr | G06F 21/10 726/27 |
| 2006/0150257 A1 | 7/2006 | Leung et al. | |
| 2006/0175417 A1 | 8/2006 | Ho | |
| 2006/0259439 A1 | 11/2006 | Mann, III et al. | |
| 2006/0287004 A1 * | 12/2006 | Fuqua | G06Q 20/0658 455/558 |
| 2007/0050871 A1 * | 3/2007 | Mashhour | G06Q 20/16 705/65 |
| 2007/0067630 A1 | 3/2007 | Lenkov et al. | |
| 2007/0098155 A1 | 5/2007 | Nagasawa et al. | |
| 2007/0106564 A1 | 5/2007 | Matotek et al. | |
| 2007/0125840 A1 * | 6/2007 | Law | G06Q 20/26 235/379 |
| 2007/0130463 A1 * | 6/2007 | Law | G06F 21/41 713/168 |
| 2007/0143230 A1 | 6/2007 | Narainsamy et al. | |
| 2007/0198434 A1 * | 8/2007 | Jang | G06F 21/10 705/67 |
| 2007/0260544 A1 | 11/2007 | Wankmueller | |
| 2008/0079704 A1 * | 4/2008 | Joshi | H04N 5/33 345/207 |
| 2008/0091614 A1 * | 4/2008 | Bas Bayod | G06Q 20/04 705/71 |
| 2008/0154778 A1 | 6/2008 | Lee et al. | |
| 2008/0275799 A1 | 11/2008 | Randazza et al. | |
| 2008/0275819 A1 * | 11/2008 | Rifai | G06Q 20/32 705/44 |
| 2009/0024533 A1 * | 1/2009 | Fernandes | G06Q 20/10 705/75 |
| 2009/0031143 A1 * | 1/2009 | Hodzic | G06F 21/72 713/193 |
| 2009/0037373 A1 * | 2/2009 | Gilbert | H04L 67/1095 |
| 2009/0099961 A1 * | 4/2009 | Ogilvy | G06Q 20/4014 235/379 |
| 2009/0240622 A1 | 9/2009 | Zandonadi | |
| 2009/0281949 A1 | 11/2009 | Coppinger | |
| 2009/0288012 A1 * | 11/2009 | Hertel | G06Q 20/326 715/738 |
| 2009/0307141 A1 * | 12/2009 | Kongalath | G06Q 20/4016 705/72 |
| 2010/0019034 A1 * | 1/2010 | Sherf | G07F 7/1025 235/382 |
| 2010/0063893 A1 | 3/2010 | Townsend | |
| 2010/0131764 A1 * | 5/2010 | Goh | H04L 9/321 713/171 |
| 2010/0299522 A1 * | 11/2010 | Khambete | H04N 21/4627 713/168 |
| 2010/0306109 A1 * | 12/2010 | Keisala | H04L 63/0853 705/44 |
| 2012/0023567 A1 * | 1/2012 | Hammad | G06Q 20/4016 726/9 |
| 2012/0173877 A1 | 7/2012 | Pendakur et al. | |
| 2012/0231844 A1 * | 9/2012 | Coppinger | G06Q 20/3278 455/558 |
| 2013/0001304 A1 * | 1/2013 | Xu | G06Q 20/38215 235/380 |
| 2013/0006866 A1 | 1/2013 | Pendakur et al. | |
| 2013/0198086 A1 * | 8/2013 | Mardikar | G06Q 20/40 705/71 |
| 2013/0212026 A1 | 8/2013 | Powell et al. | |
| 2013/0226815 A1 * | 8/2013 | Ibasco | H04W 12/033 705/71 |
| 2013/0283392 A1 | 10/2013 | Mirashrafi et al. | |
| 2014/0004903 A1 * | 1/2014 | Tsai | H04W 88/06 455/558 |
| 2014/0080428 A1 | 3/2014 | Rhoads et al. | |
| 2014/0136350 A1 * | 5/2014 | Savolainen | G06Q 20/341 705/17 |
| 2015/0046340 A1 * | 2/2015 | Dimmick | H04L 63/104 705/72 |
| 2015/0206149 A1 * | 7/2015 | Kurian | G06Q 20/38215 705/71 |
| 2015/0254549 A1 * | 9/2015 | Newcombe | G06K 19/083 235/493 |
| 2015/0264724 A1 * | 9/2015 | Yao | H04W 12/02 705/39 |
| 2015/0302398 A1 * | 10/2015 | Desai | G06Q 20/367 705/41 |
| 2015/0348009 A1 * | 12/2015 | Brown | G06K 7/10831 705/16 |
| 2015/0379510 A1 * | 12/2015 | Smith | G06Q 20/3829 705/71 |
| 2016/0149918 A1 * | 5/2016 | Chai | G06Q 20/047 726/4 |
| 2016/0328708 A1 * | 11/2016 | Ibasco | G06Q 20/3823 |

(56) References Cited

U.S. PATENT DOCUMENTS

| | | | | |
|---|---|---|---|---|
| 2016/0379298 A1* | 12/2016 | Isaacson | ............ | G06Q 30/0633 |
| | | | | 705/26.62 |
| 2017/0076277 A1* | 3/2017 | Zhou | ................ | G06K 19/06028 |
| 2017/0236143 A1* | 8/2017 | Code | .................... | G06Q 20/387 |
| | | | | 705/14.27 |
| 2017/0287090 A1* | 10/2017 | Hunn | ...................... | G06F 21/64 |
| 2018/0091316 A1* | 3/2018 | Stradling | ............ | G06F 12/1408 |
| 2018/0197172 A1* | 7/2018 | Coburn | ................ | H04L 9/0637 |
| 2018/0218358 A1* | 8/2018 | Mardikar | ............... | G06Q 20/40 |
| 2018/0330343 A1* | 11/2018 | Gray | ................ | G06Q 20/3829 |
| 2019/0081789 A1* | 3/2019 | Madisetti | ............. | H04L 9/3213 |
| 2019/0108499 A1* | 4/2019 | Liu | ........................ | H04L 9/3239 |
| 2019/0175763 A1* | 6/2019 | Shapiro | .............. | A61K 48/0075 |
| 2020/0067696 A1* | 2/2020 | Sarin | .................. | G06Q 20/3825 |
| 2020/0349054 A1* | 11/2020 | Dai | ..................... | H04L 63/1433 |

FOREIGN PATENT DOCUMENTS

| | | |
|---|---|---|
| CN | 201117020 Y | 9/2008 |
| JP | 2007114404 A2 | 5/2007 |
| JP | 2008529172 A | 7/2008 |
| JP | 2009181332 A2 | 8/2009 |
| JP | 2010020513 A2 | 1/2010 |
| JP | 2010526368 A | 7/2010 |
| JP | 2012524927 A | 10/2012 |
| KR | 10-2008-0079704 | 11/2008 |
| WO | 2003094491 A1 | 11/2003 |
| WO | 2004049621 A1 | 6/2004 |
| WO | 2007053117 A1 | 5/2007 |
| WO | WO 2007/138021 A1 | 12/2007 |
| WO | 2008136764 A1 | 11/2008 |
| WO | WO 2009/007653 A1 | 1/2009 |
| WO | WO 2009/111858 A1 | 9/2009 |
| WO | 2010122520 A2 | 10/2010 |
| WO | WO 2010/128442 A2 | 11/2010 |

OTHER PUBLICATIONS

Office Action in U.S. Appl. No. 13/884,935 dated Jan. 22, 2018.
Office Action in U.S. Appl. No. 13/884,935, dated Jan. 26, 2017.
Office Action in U.S. Appl. No. 13/884,935, dated May 20, 2016.
Office Action in U.S. Appl. No. 13/884,935, dated Aug. 3, 2018.
"International Preliminary Examination Report on Patentability dated Apr. 5, 2012", International Application PCT/SG2010/000427, 13 pages.
"International Search Report dated Feb. 28, 2011", International Application PCT/SG2010/000427, 5 pages.
"Written Opinion dated Feb. 28, 2011", International Application PCT/SG2010/000427, 6 pages.

* cited by examiner

| Message Type ID | Bitmap | Data Elements |
|---|---|---|

Figure 3

METHOD OF PERFORMING A FINANCIAL TRANSACTION VIA UNSECURED PUBLIC TELECOMMUNICATION INFRASTRUCTURE AND AN APPARATUS FOR SAME

RELATED APPLICATIONS

This application is a divisional of U.S. application Ser. No. 13/884,935 filed on May 10, 2013, which is a 371 National Phase application claiming priority to PCT Application No. PCT/SG2010/000427 filed on Nov. 10, 2010, all of which is incorporated herein.

FIELD OF THE INVENTION

The invention relates to a method of performing a financial transaction via Unsecured Public Telecommunication Infrastructure and an apparatus for same. The invention is particularly suited to a mobile phone operating in a manner substantially identical to present Point Of Sale ("POS") payment terminals used for handling debit and credit card transactions.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Existing Payment Security Application Module ("PSAM") transactions work off the assumption that there is a secure connection between the terminal and the back end systems of the acquiring financial institution. As a result, the only security mechanism employed in these transactions is the encryption of the personal identification number ("PIN") block.

While this assumption has some merit in the case of terminals having dedicated lines and routing structures to the acquiring financial institution, it is still possible to intercept transmissions flowing through such architecture.

By contrast, the applicant has developed the current invention based on the contrary assumption that there is no secure connection between a terminal and the back end system. As a result, the applicant's invention allows for the use of unsecured public telecommunication infrastructure for the handling of PSAM transactions, such as the short messaging service ("SMS"). Use of SMS infrastructure and protocols to handle financial transactions has further problems, however, in the limited amount of data that may be used to communication such transactions and its associated inherent resistance to the typically high data overheads of encryption.

At the same time, the hardware specifications for executing PSAM applications have been defined in the *Terminal Architecture for PSAM Application* document published by Europay International, PBS A/S and Visa International Service Association in 2000. However, as contemplated by this document, the PSAM is a standardised terminal having an architecture-independent structure.

The result has been the development of specific point-of-sale terminals with dedicated hardware. In the case of mobile point-of-sale terminals, the PSAM chip handles all PSAM functionality, while a separate SIM card handles transport of the data generated by the PSAM across the wireless network.

As a result of this architecture:

The form factor of the mobile point of sale terminal must be of sufficient size to accommodate the two separate chips (the PSAM chip and the SIM card); and Mass consumer SIM devices, such as mobile phones, are unable to be used to handle PSAM applications.

This latter restriction, combined with the high cost of dedicated PSAM hardware, has stifled the adoption of PSAMs by merchants to handle financial transactions.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the present invention there is a method of performing a financial transaction via unsecured public telecommunication infrastructure comprising the steps of:

collecting data relating to a specified financial transaction type;

building a transaction token including collected data and/or data derived from the collected data;

encrypting the transaction token;

creating a financial transaction protocol message incorporating the encrypted transaction token as dependent on a selected transport channel through which the message is to be conveyed; and conveying the financial transaction protocol message using the selected transport channel and by way of the unsecured public telecommunication infrastructure to a destination where the financial transaction protocol message will be further processed.

The step of collecting data relating to a specified transaction type may further include the sub-step of collecting authentication data which is thereafter encrypted, the transaction token built thereafter including the encrypted authentication data. The transaction token data may also be formatted and/or encrypted.

The step of collecting data relating to a specified financial transaction type may also include obtaining data by at least one of the following ways: from files stored on a device used to obtain the data; from a data reader associated with, or integrated into, the device used to obtain the data; from a customer by way of the user interface of the device used to obtain the data. The data so obtained may include a set of transaction rules applicable to the financial transaction type.

The transaction token may also be padded as required for the selected transport channel.

The method may also include the step of calculating a session key, the session key then being used to encrypt the transaction token during the step of encrypting the transaction token.

The selected transport channel may be General Packet Radio System ("GPRS") or SMS.

Where the selected transport channel is GPRS, the step of creating a transaction token may include the sub-steps of:

appending an end token record data value to the transaction token; and padding the transaction token with null values until the altered transaction token is a multiple of 8 bytes.

Similarly, the step of encrypting the transaction token further includes the sub-steps of calculating a message authentication code session key and encrypting the altered and padded transaction token using the message authentication code session key.

Also when the selected transport channel is GPRS, the step of creating a financial transaction protocol message may include the sub-step of creating a key serial number and where the financial transaction protocol message so created comprises the key serial number the transaction token and a message authentication code session key.

Where the selected transport channel is SMS, the step of building the transaction token further includes the sub-steps of determining a padding counter and a message counter and appending the padding counter and the message counter to the message. The step of encrypting the transaction token may also includes the sub-step of encrypting the transaction token using a ciphering key based on 3GPP TS 03.48 specifications.

Also when the selected transport channel is SMS, the step of creating a financial transaction protocol message may include the sub-step of prefixing the encrypted transaction token with a SMS header.

In accordance with a second aspect of the present invention there is a communications device for facilitating the performance of a financial transaction via unsecured public telecommunication infrastructure, the communications device operable to execute software stored thereon or on removable media in data and control communication with the device to:

collect data relating to a specified financial transaction type;
  build a transaction token including collected data and/or data derived from the collected data;
  encrypt the transaction token;
  create a financial transaction protocol message incorporating the encrypted transaction token as dependent on a selected transport channel through which the message is to be conveyed; and
  convey the financial transaction protocol message using the selected transport channel and by way of the unsecured public telecommunication infrastructure to a destination where the financial transaction protocol message will be further processed.

The collected data may include authentication data. The transaction token may include the authentication data in an encrypted form.

The communications device may also include a reader for reading information stored on external devices.

Preferably, the communications device is operable to communicate by way of one or more of the following transport channels: GPRS; SMS.

In accordance with a third aspect of the present invention there is a card comprising at least one integrated circuit, the card being of similar size and shape to ordinary Subscriber Identity Module ("SIM") card where, when the card is received within a device having a SIM card interface, executable software stored on a memory means of the at least one integrated circuit, when executed, is able to communicate with software stored on the device thereby allowing the device to provide both SIM and PSAM functionality to a user of the device.

The device may only able to be operated as a SIM or PSAM at any point in time and communication between the software stored on the memory means and software stored on the device is by way of a logical communications channel.

BRIEF DESCRIPTION OF THE DRAWINGS

The invention will now be described, by way of example only, with reference to the accompanying drawings, in which:

FIG. 3 is a graphical representation of a transaction token as used in the present invention.

PREFERRED EMBODIMENTS OF THE INVENTION

Figure 1:
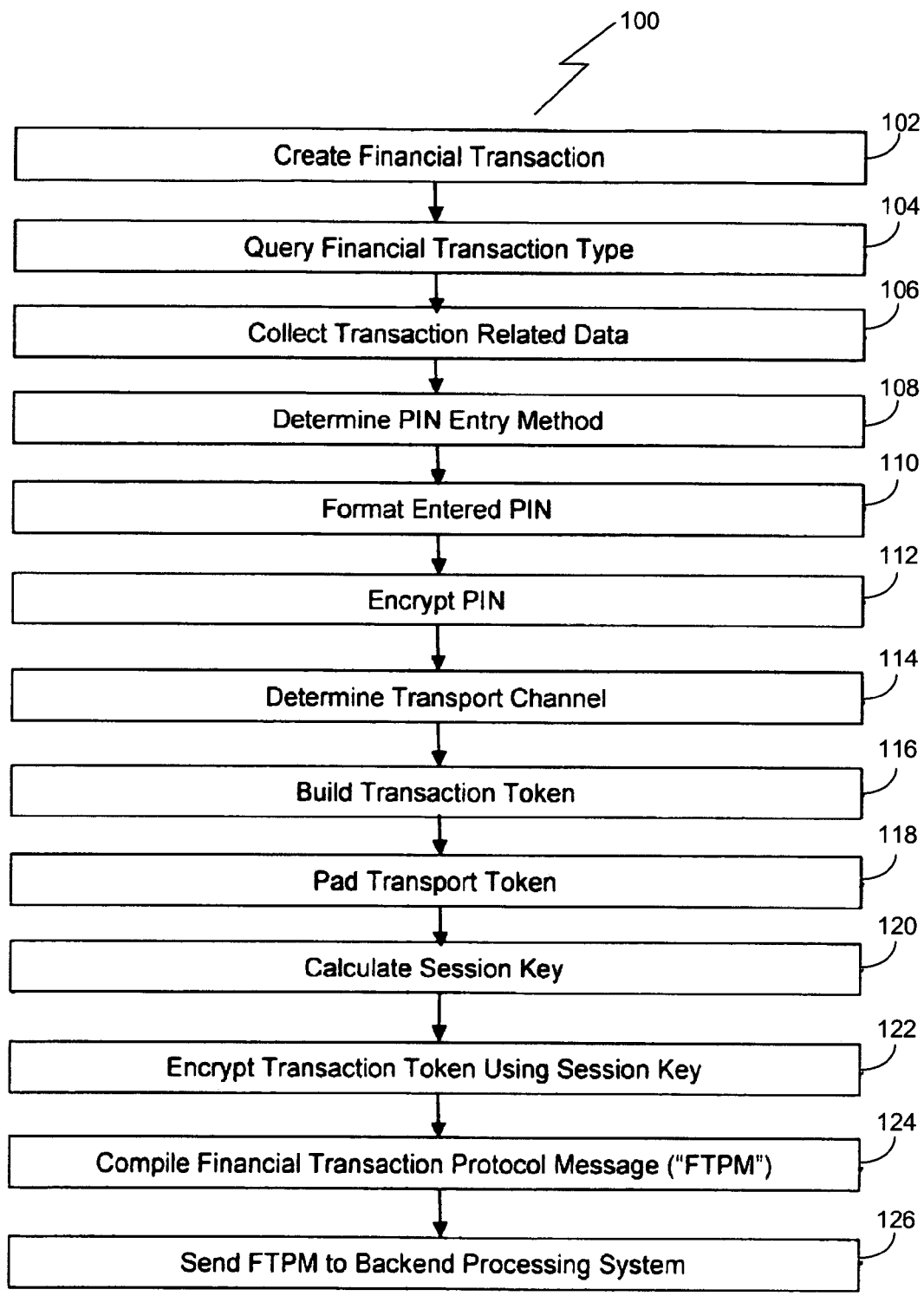
FIG. 1 is a flowchart of a first embodiment of the present invention.
Figure 2:
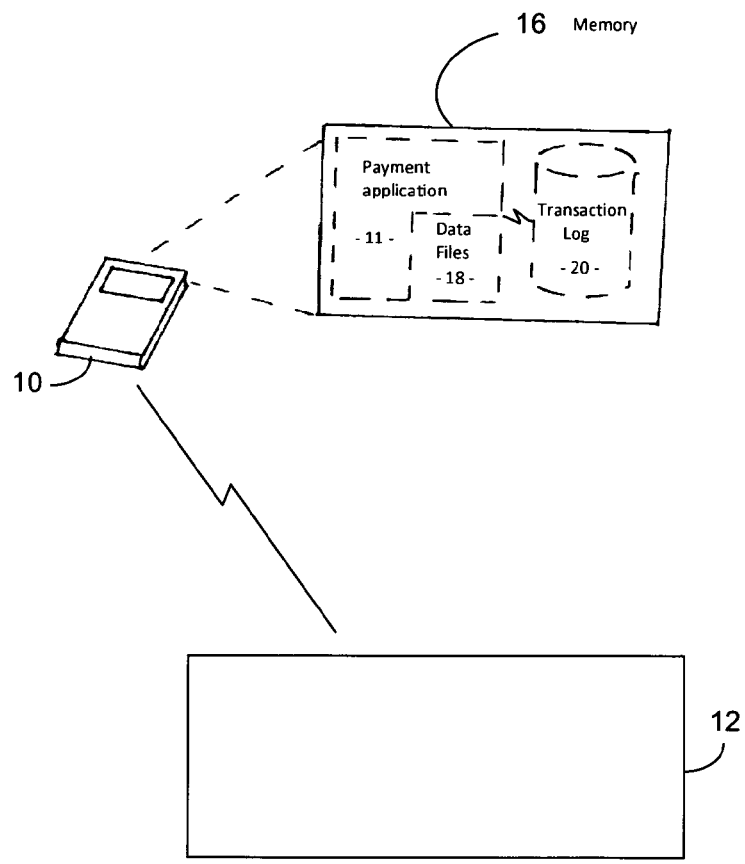
FIG. 2 is a general schematic of hardware used in the first embodiment of the present invention.
Figure 4:
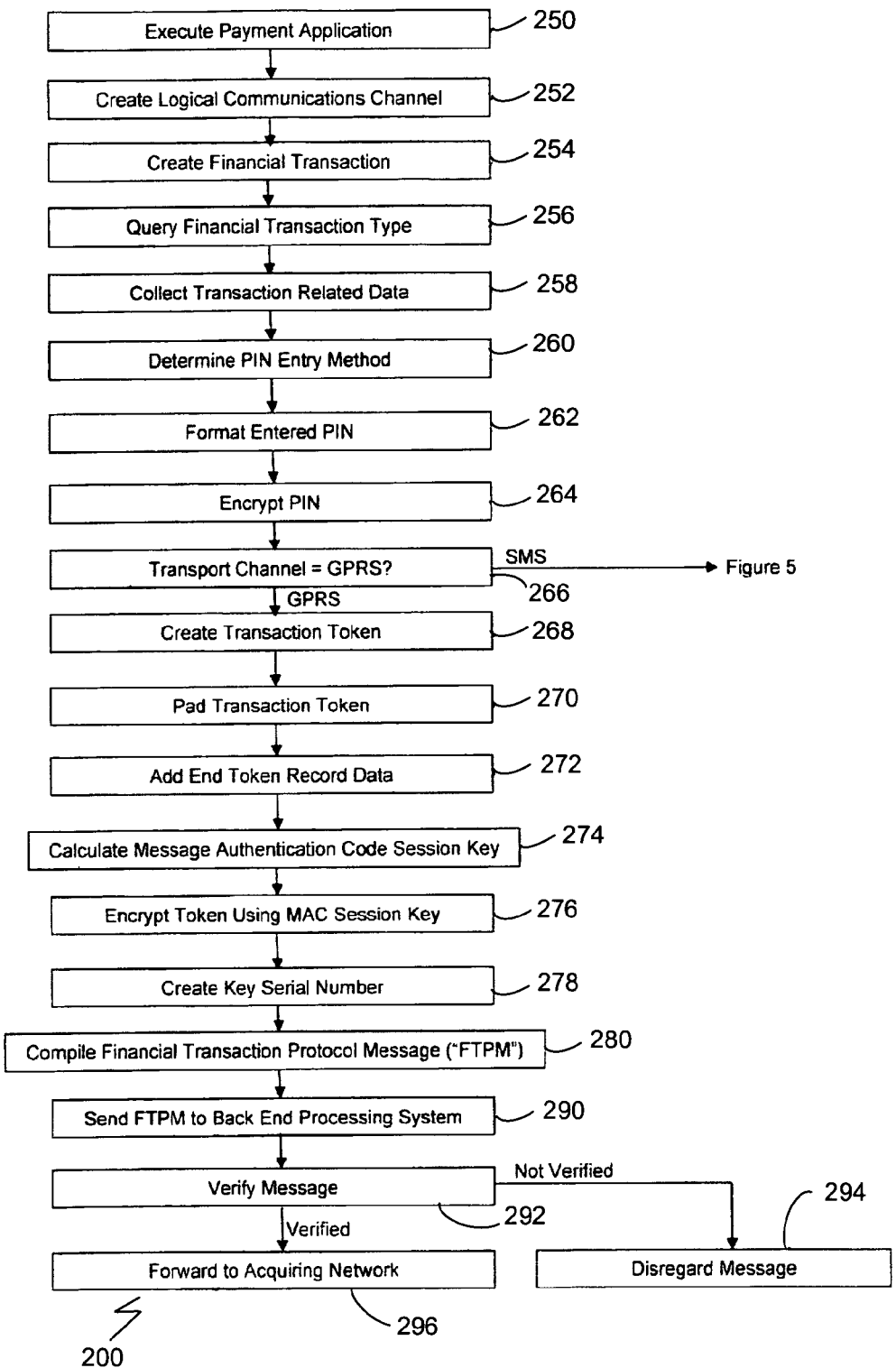
FIG. 4 is a first flowchart of a second embodiment of the present invention.
Figure 5:
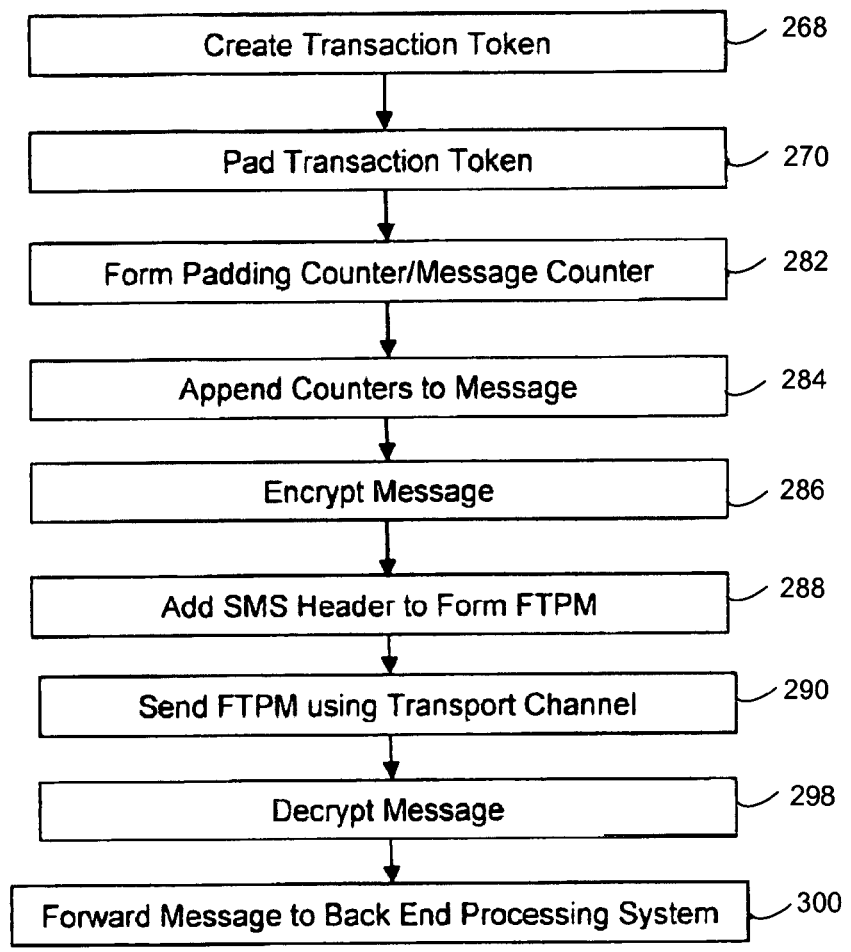
FIG. 5 is a second flowchart of a second embodiment of the present invention.
Figure 6:
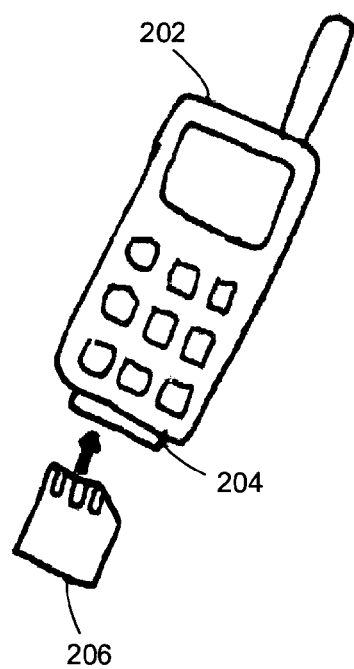
FIG. 6 is a general schematic of a communications device incorporating both SIM and PSAM functionality.

In accordance with a first embodiment of the invention there is a method of performing a financial transaction via unsecured public telecommunication infrastructure 100. A flowchart of the method 100 is shown in FIG. 1.

The underlying entities operational in the method comprise a terminal unit 10 and a back end processing system 12. A payment application 14 is a program executable on the terminal unit 10. In this embodiment, the payment application 14 is also stored in the memory 16 of the terminal unit 10.

In addition to the executable code that forms the basis for the payment application 14, the payment application 14 also includes a plurality of data files 18. The data files 18 store data needed by the payment application 14 during different application/transaction sessions. The types of data stored in the plurality of data files 18 include:

Security Data;
  Connection data; and
  Transaction data.

In the case of the transaction data, typical information stored includes the International Mobile Equipment Identity of the terminal unit 10; the processing rules for the different possible transactions to be handled by the payment application 14; the unique identification code of the back end processing system 12; and a temporary copy of the latest transaction token.

The payment application 14 also maintains a transaction log 20. The transaction log 20 contains selected details of at least the three previous transactions handled by the payment application 14 (including selected details of any response issued by the back end processing system 12). This selected information allows the payment application 14 to verify what transactions have taken place for dispute resolution purposes and also as a means of facilitating reversal of a past transaction.

It should be noted that to avoid duplication, any transaction repeat request made by the payment application 14 is not separately recorded in the transaction log 20. When a transaction repeat request is made a retry counter associated with the request is incremented as a record of this request.

The transaction log 20 is a read-only data file. The transaction log 20 maintains data in respect of prior transactions on a First In First Out basis.

The method of this first embodiment is now described as follows.

The user navigates the user interface of the terminal unit in a manner such as to instruct the terminal unit that a new financial transaction is to be created (Step 102).

When an indication is made that a new financial transaction is to be created, the terminal unit queries the user as to the type of the new financial transaction (Step 104). The user has the option of specifying one of the following types of financial transactions:

Transaction request;
Transaction repeat request; and
Transaction reversal request.

As the form of each of these types of financial transactions is dictated by the transport channel used, the method of this embodiment of the invention will now be discussed purely in the context of a transaction request.

Following specification that the new financial transaction is a transaction request, the terminal unit operates to collect data related to the transaction (Step 106). This information comes from three sources:

The terminal unit itself, including its stored file systems;
The customer's credit/debit card; and/or
The customer himself/themselves.

One element of information required is the user's PIN. The need for and method by which a PIN is entered are governed by the processing rules encapsulated in the terminal unit's stored file systems (Step 108). In situations where a PIN is required to be entered, there are two methods for PIN entry contemplated by this embodiment of the invention:

Entry by way of the terminal unit; or
Entry by way of an SIM Tool Kit ("STK") session.

In this embodiment, the processing rules specify that a PIN should be entered by way of the terminal unit.

Where PIN entry is by way of the terminal unit, the user simply enters the pin using the user interface provided. The PIN is then formatted as an ISO-0 PIN block (Step 110). The PIN Block is then encrypted using a PIN key for transmission to the back end processing system. (Step 112)

Once all required and relevant information is obtained, the information is collated and used to build a transaction token (Step 116). However, before the transaction token can be properly constructed, the transport channel of the end financial transaction must be determined (Step 114). The transport channel can be by way of any unsecured public telecommunication infrastructure capable of message handling.

Once the transport channel has been determined, an initial transaction token is created. The initial transaction token comprises three elements:

A Message Type Identifier. The message type identifier indicates the type of message being sent (eg. a transaction request; a transaction repeat request; or a transaction reversal request);
A Bitmap. The bitmap indicates which data elements are contained in the message.
The Data Elements. These are the values of the data elements referred to in the bitmap.

Figure 3:
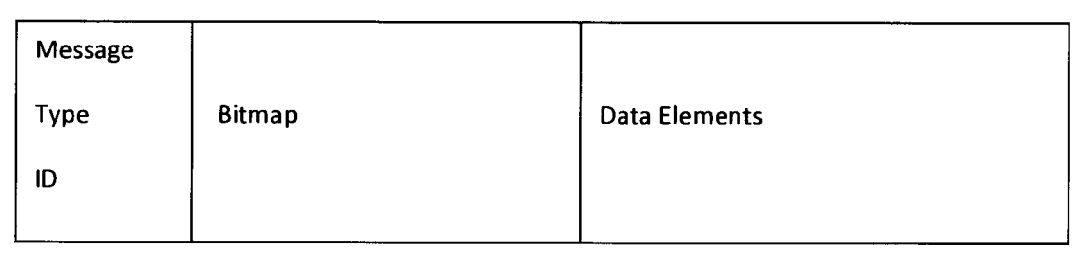

This structure is shown graphically in FIG. 3.

It should be appreciated by the person skilled in the art that the structure used to define the bitmap is primarily regulated by ISO 8583:1987. Accordingly, the structure will not be defined in more detail here.

The initial transaction token is then padded as appropriate for the selected transport channel (Step 118). This may also include the addition of various data elements to the transaction token. The end results is an altered transaction token.

A session key is then calculated (Step 120). The altered transaction token is then encrypted using the session key to form an encrypted transaction token (Step 122).

A financial transaction protocol message is then compiled comprising the encrypted transaction token and such other communication requirements as dictated by the selected transport channel (Step 124).

It should be pointed out here that the initial transaction token may include a user's PIN. In these circumstances, the PIN is encrypted using a separate key to that used to encrypt the transaction token.

The financial transaction protocol message is then sent to the back-end processing system via the selected transport channel as determined earlier (Step 126).

In accordance with a second, preferred, embodiment of the invention, where like numerals reference like parts, there is a method of performing a financial transaction 200.

In this second embodiment the terminal unit 14 is a mobile communications device 202. The mobile communications device 202 incorporates a SIM card interface 204 for receiving and releasably retaining a SIM card 206.

In this embodiment, the SIM card 206 takes the form of at least one integrated circuit formed on a physical medium. The at least one integrated circuit has erasable memory means stored thereon for storing executable software code. In this embodiment, the executable software code stored on the at least one integrated circuit is directed to two different functions—communications functionality and PSAM functionality. The executable software code stored on the at least one integrated circuit operates to provide the core functionality of its respective purpose (ie. communications functionality or PSAM functionality as appropriate).

The physical medium is of similar size and shape to other standard SIM cards (not shown) and similarly has contacts at similar positions. The contacts press against, and allow for communication between, the SIM card 206 and the SIM card interface 204 when the SIM card 206 is releasable retained therein.

In this manner, the interaction of the software stored on the SIM card 206 directed towards communication functionality and complimentary software stored on the mobile communications device 202 allows the mobile communications device 202 to communicate as per normal mobile phone devices (or their equivalents). This includes providing SMS messaging capability. Hereafter this will be referred to as the SIM application.

Similarly, the interaction of the software stored on the SIM card 206 directed towards PSAM functionality and complimentary software stored on the mobile communications device 202 allows the mobile communications device 202 to act as a PSAM. In this manner, when PSAM functionality is initiated, the interface of the mobile communications device 202 acts as the PSAM interface. Hereafter this will be referred to as the payment application.

The method of this second embodiment is now described as follows.

The user operates the mobile communication device 202 as is required to initiate execution of the payment application (Step 250). Once initiated, the payment application operates to create a new logical communications channel between the code portion stored on the device 202 and the code portion stored on the SIM card 206 (Step 252). This is necessary to prevent interruption of the normal operating procedure of the SIM application.

The logical communications channel remains open until such time as the payment application closes it.

The user then navigates the user interface of the payment application in a manner such as to instruct the payment application that a new financial transaction is to be created (Step 254).

When an indication is made that a new financial transaction is to be created, the payment application queries the user as to the type of the new financial transaction (Step 256). The user has the option of specifying one of the following types of financial transactions:

Transaction request;
Transaction repeat request; and
Transaction reversal request.

As the form of each of these types of financial transactions is dictated by the transport channel used, the method of this embodiment of the invention will now be discussed purely in the context of a transaction request.

Following specification that the new financial transaction is a transaction request, the payment application operates to collect data related to the transaction (Step 258). This information comes from four sources:

The payment application itself;
The file system of the SIM card 206;
The customer's credit/debit card; and/or
Where the processing rules so designate, an STK session.

For the purposes of this embodiment, the customer's credit/debit card information is obtained by way of a card reader incorporated in, or otherwise attached to, the mobile communications device 202.

Furthermore, as a means of explaining this aspect of the invention, the processing rules require a PIN to be entered by way of an STK session (Step 260).

Obtaining a PIN via an STK session is handled by the SIM application as would be known to a person skilled in the art. However, once an STK session has commenced, communication between the payment application and the SIM application will receive an error message to indicate that the SIM card is busy with an STK session.

After the PIN has been retrieved by way of the STK session, the PIN is formatted as an ISO-0 PIN block (Step 262). The formatted PIN block is then encrypted using an exclusive-use key (Step 264). In this embodiment, the encryption is a triple DES encryption with in outer CBC mode using three different keys.

Once all required and relevant information is obtained, the information is collated and used to build a transaction token. However, before the transaction token can be properly constructed, the transport channel of the end financial transaction must be determined. In this embodiment, two alternative transport channels are available:

GPRS; or
SMS

GPRS is the preferred transport channel and, as such, a check is first made by the payment application to determine whether the financial transaction can be communicated by way of GPRS (Step 266). If so, an initial transaction token is created having the same structure as described in the first embodiment of the invention (Step 268).

The initial transaction token is then padded according to ISO 7816-4/ISO 9797-1 method 2 requirements (Step 270). An end token record data value is then appended to the padded token before further padding the token with the smallest number of null values until the altered token is a multiple of 8 bytes (Step 272).

A 128-bit message authentication code session key is then calculated (Step 274). The altered token is then encrypted using the message authentication code session key to form an encrypted transaction token (step 276). In this embodiment, the encryption techniques used are DES based algorithms.

A key serial number is then also created (Step 278). The key serial number is an 80 bit value.

The financial transaction protocol message is then compiled with the key serial number forming the first element of the protocol message, followed by the transaction token and finally the message authentication code session key (Step 280).

Alternatively, if it is not possible to communicate the financial transaction by way of GPRS, the financial transaction protocol message is compiled as follows.

The initial transaction token is created and padded in the same manner as described for a GPRS-based communication (Steps 268 and 270). However, as part of this process a padding counter and message counter are formed (Step 282). The padding counter and message counter are then appended to the message to form an unencrypted message (Step 284). The unencrypted message is then encrypted using a ciphering key based on 3GPP TS 03.48 specifications (Step 286).

An SMS header is then added as a precursor to the encrypted message to form a financial transaction protocol message ready for sending (Step 288).

It should be pointed out here that the initial transaction token may include a user's PIN. In these circumstances, the PIN is encrypted using a separate key to that used to encrypt the transaction token.

The financial transaction protocol message is then sent to the back-end processing system using the appropriate transport channel as determined earlier (Step 290). In the case of communication by way of SMS message, this involves passing the message to the SIM application for transmission.

On receipt of a financial transaction protocol message by way of the GPRS transport channel, the back-end processing system first verifies the message authentication code with reference to the message authentication code session key (Step 292). If the message authentication code cannot be verified the financial transaction protocol message is disregarded and no further processing occurs (Step 294). However, as the inability to verify the financial transaction protocol message may be the result of transmission errors or corrupted data; the transaction is not terminated. The back-end processing system merely waits for the message to time out and the terminal unit initiate a retry message.

Once verified, the financial transaction protocol message is decrypted and forwarded to the acquiring network (Step 296).

In the case of financial transaction protocol messages sent by way of the SMS transport channel, it is assumed that a SMSC to which the message is sent decrypts the financial transaction protocol message prior to forwarding to the back-end processing system (Step 298). The back-end processing system then forwards the decrypted message to the acquiring network (Step 300).

A method and apparatus constructed in accordance with this embodiment of the invention has advantages over other embodiments. In particular, as would be appreciated by the person skilled in the art, this embodiment addresses concerns such as:

The vulnerability of normal SIMs;
The limited memory available to a SIM for use during processing.
The further limited memory of the SIM available for use by other applications (such as the payment application); and The large form factor required by existing units incorporating PSAM and SIM functionality.

It should be appreciated by the person skilled in the art that the above invention is not limited to the embodiment described. In particular, the following modifications and improvements may be made without departing from the scope of the present invention:

Forms of unsecured public telecommunication infrastructure with which the invention as described above can be implemented include: existing wired telephony systems; the internet. Accordingly, the unsecured public telecommunication infrastructure may be a wired or wireless telecommunication system.

The structure and codes used in forming the bitmap and data elements may vary as required by the system as implemented. Accordingly, any combination of structure and code may be used with the inventions described above.

The form of encryption used is subject only to the constraints of the transportation medium and the desired level of security to be adopted. For instance, if the application concerned requires message authentication, the encryption technique used for the message authentication code can be the ISO 9797-1 algorithm 3, using the DES algorithm in CBC mode.

It is preferred that the PIN block be encrypted using the 3DES-CBC/CMAC encryption standard.

It is preferred that the encryption of the transaction token as a whole be the 3DES-CBC/CMAC encryption standard where the transportation medium is GPRS and GSM 03.48 where the transportation medium is SMS.

A third encryption envelope may be used to secure an encrypted transaction token.

Existing public keys can be used for encryption and authentication of the token as a whole, but the PIN must be encrypted using a separate, exclusive use private key.

The user interface of the terminal unit 14 may be any of the following: a dedicated physical keypad; a touchscreen keypad; a digital stylus combined with character or handwriting recognition software.

Where the terminal unit 14 is not dedicated towards processing transactions, the processing application may be required to setup secure communication channels within the terminal unit 14 itself to address security concerns.

An additional secure logical communications channel may be set up between the SIM application and the payment application where deemed necessary.

The processing rules also govern the amount of attempts that may be allowed for entering a valid PIN.

The number of times that a transaction repeat request may be sent in respect of an initial transaction request is also governed by the processing rules.

Information relating to the transaction may be automatically obtained through a card reader or the like, or may be indirectly obtained by the customer inputting details related to the credit/debit card into the terminal unit 14.

The user's credit/debit card may be magnetic stripe card, a smart card such as an RFID card, near-field communication data reader or the like. The invention merely requires that an appropriate reader, or input device for entering information regarding the credit/debit card, be incorporated as part of the terminal unit 14.

While the invention has been described in the context of currency transactions, the invention should not be considered as limited to such transactions. The invention could just as easily be used to handle transactions involving credits, values, points or other mechanisms used by merchants for conducting a transaction (including loyalty and reward schemes).

Credit, debit and other banking applications operable to execute on the SIM card 206 may operate in conjunction with the PSAM functionality of the SIM card 206 to complete various financial transactions not otherwise described in this specification.

While the invention is contemplated as being in widespread use with devices whose functions centre around an in-built SIM card interface 204, the invention can also be used with any device that is otherwise in connection with an adaptor incorporating such a SIM card interface 204.

It should be further appreciated by the person skilled in the art that one or more of the above modifications or improvements, not being mutually exclusive, may be further combined to form yet further embodiments of the present invention.

The invention claimed is:

1. A mobile communications device comprising a dual-use card with a first software stored on a memory means of at least one integrated circuit and a second software stored on the device,
   (a) wherein the dual-use card has a size and shape substantially similar to a Subscriber Identification Module (SIM) card;
   (b) wherein the first software has both a SIM-functionality and a Payment Security Application Module (PSAM) functionality;
   (c) wherein the SIM functionality includes:
      (i) a file system;
      (ii) an international mobile subscriber identity number (IMSI) and an IMSI key to identify and authenticate a user across an unsecured public network; and
      (iii) a Short Message Service (SMS) or a general packet radio system (GPRS) messaging capability;
   (d) wherein the PSAM functionality includes:
      (i) building of a transaction token including collected data and/or data derived from the collected data; and
      (ii) encryption of the transaction token;
   (e) wherein the second software, when executed, causes the device to provide:
      (i) formatting and encryption of a user personal identification number (PIN) via a SIM Tool Kit (STK) session to create an encrypted message; and
      (ii) transport of the transaction token and the encrypted message via an SMS or a GPRS message across the unsecured public network;
   (f) wherein the device may only provide the SIM functionality or provide the PSAM functionality at any point in time and communication between the first software stored on the memory means and the second software stored on the device is by way of a first logical communications channel and a second logical communications channel, wherein the second logical communications channel is independent from the first logical communications channel; and
   (g) wherein the second logical communications channel is generated between the first software stored on the memory means and the second software stored on the device when the PSAM functionality is required to process a payment transaction request and wherein the second logical communications channel for the PSAM functionality is closed once the payment transaction request has been processed.

2. The device of claim 1, wherein the device is in data communication with a credit/debit card reader configured to collect customer credit/debit card information.

* * * * *